United States Patent [19]

Hartmann et al.

[11] Patent Number: 4,919,334

[45] Date of Patent: Apr. 24, 1990

[54] BLOW GUN ASSEMBLY

[75] Inventors: Leonard J. Hartmann, St. Louis; Michael E. Weller, House Springs, both of Mo.

[73] Assignee: Dynaquip Controls Corporation, Fenton, Mo.

[21] Appl. No.: 300,084

[22] Filed: Jan. 19, 1989

[51] Int. Cl.⁵ ............................................. B05B 15/06
[52] U.S. Cl. .................................................... 239/600
[58] Field of Search ............... 239/DIG. 22, 525, 526, 239/291, 600, DIG. 21; 285/316, 921

[56] References Cited

U.S. PATENT DOCUMENTS

| | | |
|---|---|---|
| 1,054,126 | 2/1913 | Lindberg . |
| 1,353,299 | 9/1920 | Wilson . |
| 2,419,720 | 4/1947 | Knight et al. . |
| 2,586,145 | 2/1952 | Breuer et al. . |
| 2,604,361 | 7/1952 | Yates ..................................... 239/291 |
| 2,647,798 | 8/1953 | Ballard ................................. 239/600 |
| 2,949,244 | 8/1960 | Philippe . |
| 3,106,378 | 10/1963 | Hellstern . |
| 3,106,379 | 10/1963 | Sciuto et al. . |
| 3,439,993 | 4/1969 | Thorne-Thomsen . |
| 3,599,876 | 8/1971 | Kyburg ................................. 239/291 |
| 3,938,218 | 2/1976 | DeAmicis ............................. 15/401 |
| 3,980,238 | 9/1976 | Adolitta ....................... 239/DIG. 22 |
| 4,060,874 | 12/1977 | Furutsutsumi ........................ 15/405 |
| 4,776,614 | 10/1988 | Morrison et al. .................... 285/316 |

FOREIGN PATENT DOCUMENTS 2098882 12/1982 United Kingdom ............... 239/600

*Primary Examiner*—Andres Kashnikow
*Assistant Examiner*—Kevin P. Weldon
*Attorney, Agent, or Firm*—Cohn, Powell & Hind

[57] ABSTRACT

This blow gun assembly (10) includes a blow gun (12) which includes a quick-change coupling adaptor (20) to facilitate the connection of an assortment of nozzles (22). The coupling adaptor includes a body (34) threadedly connected to the outlet end (18) of the blow gun and having a ball lock latch mechanism (42, 44), a spring-biased plunger (50) and a spring-biased external sleeve (60). The nozzle icludes a circumferential groove (30) receiving the balls when the nozzle is pushed into the adaptor body against the bias of the plunger to latch the nozzle in place. The plunger (50) includes guide tongue elements (58) received by cooperating grooves (48) in the body. The plunger tongues are spaced rearwardly of the forward end of the plunger so that the plunger tongues engage the balls to limit forward movement and the plunger overlaps the balls in the forward position, when the nozzle is ejected by pulling back on the sleeve.

10 Claims, 1 Drawing Sheet

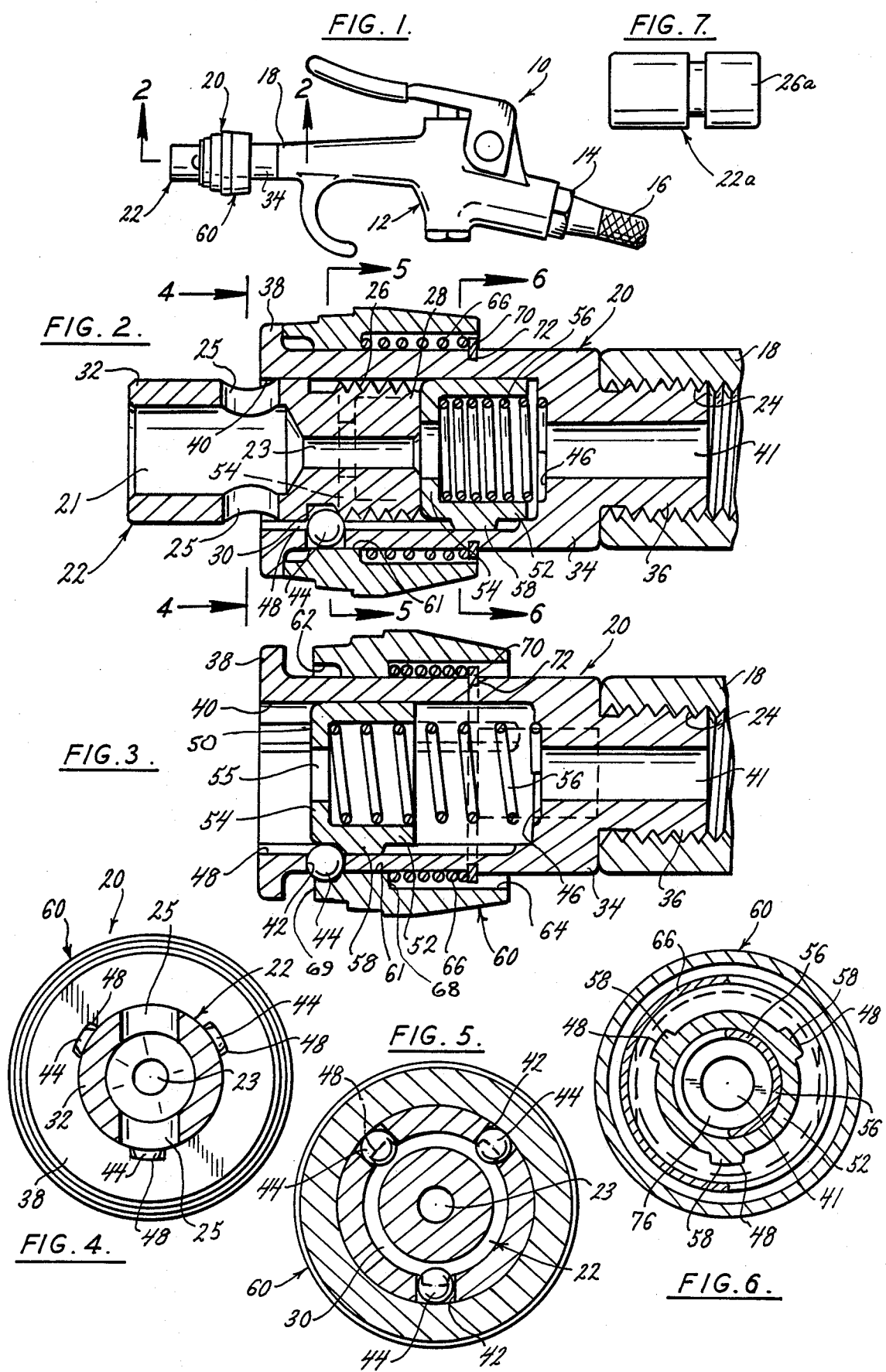

BLOW GUN ASSEMBLY

BACKGROUND OF THE INVENTION

This invention relates generally to a quick-change nozzle coupling on a blow gun and more particularly to an improved blow gun assembly providing a quick-change coupling adaptor for a variety of nozzles.

One of the more popular conventional blow guns of the type under consideration includes a threaded outlet providing for the connection of a selection of assorted nozzles each intended to perform a specific task. Such nozzles can include general duty, for clearing dust and chips and for drying; rubber tipped for blowing out oil lines and for avoiding damage to delicate surfaces; booster, when higher flow rates are required and extension, for removing chip etc. from crevices and the like. With this type of blow gun each nozzle is provided with a threaded end and nozzle replacement requires that the nozzle in use be threadedly disconnected so that the replacement nozzle can be threadedly connected. Each of these operations is time consuming which is a considerable disadvantage. Another disadvantage is that if an operator has greasy hands the result can be that the nozzle is not tightened properly and can work loose and become inadvertently disconnected and consequently easily lost.

While quick-change couplings have been in use for many years for the connection of air and fluid lines such couplings are complicated in construction and unsuitable for use on blow guns and are not known for such use.

The present blow gun quick-change coupling adaptor solves these and other problems in a manner not revealed by the known prior art.

SUMMARY OF THE INVENTION

The present blow gun assembly provides a coupling adaptor which can readily be fitted to a conventional blow gun to facilitate the rapid change over from one type of nozzle to another.

An advantage of the present blow gun assembly is that it is adapted to use nozzles of the type normally used for threaded connection to a conventional blow gun by making a simple modification to each nozzle so that it is suitable for use with a quick connect/disconnect coupling.

Another advantage of the quick-change coupling adaptor is that a nozzle can be released by pulling back the adaptor sleeve so that the nozzle ejects automatically, replacement of a new nozzle being made by simply pushing the nozzle into the coupling until it locks in place. Another advantage is that the adaptor sleeve is configured to facilitate gripping.

This air gun assembly comprises an air gun including an inlet connectible to an air supply and an outlet selectively delivering a stream of pressurized air; a nozzle having an inlet and an outlet for directing the air stream and a quick-change coupling adaptor including means at one end connectible to the outlet of the air gun and means at the other end adapted to receive the nozzle in quick-change relation.

It is an aspect of this invention to provide that the air gun outlet includes a threaded female socket portion, and the nozzle inlet includes a threaded male portion receivable within the air gun socket portion in threaded relation.

It is another aspect of this invention to provide that the nozzle includes latch-engaging means and to provide that the adaptor includes a body having a socket defining an open end receiving the nozzle in sliding relation; latch means carried by the body in spaced relation from said open end; a plunger slidably mounted in the socket and including means biasing said plunger outwardly toward said open end, said plunger being engageable by said latch means to limit outward movement of said plunger and being engageable by said nozzle to move said plunger inwardly out of engagement with said latch means when said nozzle is inserted within said body socket and a sleeve slidably mounted on the body and including means biasing said sleeve towards said socket open end, said sleeve being engageable with said latch means to urge said latch means into engagement with said nozzle latch-engaging means when said sleeve is in one position, and said sleeve retaining said latch means when said latch means moves out of engagement with said nozzle latch engaging means when said sleeve is in another position.

It is yet another aspect of this invention to provide that the latch means includes at least one opening having a ball disposed therewithin and that the nozzle latch-engaging means includes a circumferential groove receiving said ball.

It is still another aspect of this invention to provide at least one axially extending guide means between said adaptor body socket and said plunger for guiding said plunger within the socket and another aspect to provide that the guide means includes cooperating tongue and groove elements, one of said elements being formed on the socket wall and the other of said elements being formed on the plunger wall.

Another aspect of this invention is to provide that the latch means includes a plurality of circumferentially spaced openings each having a ball disposed therewithin, to provide a plurality of guide means disposed in circumferentially spaced axially extending relation, and to provide that said latch balls are coincidentially spaced within said guide means whereby each ball is disposed in aligned relation with a guide means.

Yet another aspect of this invention is to provide that the guide grooves are formed in said socket and said guide tongues are formed on said plunger and another aspect to provide that said plunger includes a forwardly disposed endwall, said tongues being disposed rearwardly of said endwall so that said plunger is disposed in overlapping locking relation with said balls when said plunger is in the forward position.

Still another aspect of this invention is to provide that the body includes a circumferentially extending abutment flange and the sleeve includes an annular rim engageable with said flange to limit movement of said sleeve on said body.

A further aspect of this invention is to provide that the sleeve includes an internally formed annular socket engageable by said balls and sized to permit said balls to move radially outwardly relative to said body to permit said nozzle to be removed from said socket.

It is an aspect of this invention to provide that the sleeve includes a plurality of circumferentially spaced longitudinally spaced steps providing a gripping surface.

It is an aspect of this invention to provide a quick-change coupling adaptor which is relatively simple and inexpensive to manufacture and can easily be installed and used.

BRIEF DESCRIPTION OF THE DRAWINGS

FIG. 1 is a side elevational view of a blow gun assembly including a quick change coupling adaptor and nozzle;

FIG. 2 is a sectional view taken along line 2—2 of FIG. 1 showing the quick change coupling adaptor with the nozzle in position;

FIG. 3 is a similar view to FIG. 2 showing the quick change coupling adaptor without the nozzle;

FIG. 4 is a cross sectional view taken along line 4—4 of FIG. 2;

FIG. 5 is a cross sectional view taken along line 5—5 of FIG. 2;

FIG. 6 is a cross sectional view taken along line 6—6 of FIG. 2; and

FIG. 7 includes a reduced side elevational view of a modified nozzle.

DESCRIPTION OF THE PREFERRED EMBODIMENT

Referring now by reference numerals to the drawing and first to FIGS. 1 and 2 it will be understood that the blow gun assembly is indicated by numeral 10 and includes a conventional, trigger operated blow gun 12, having an inlet 14 connected by means of a hose 16 to an air supply (not shown) and having an outlet 18 fitted with a quick change coupling adaptor 20 for a nozzle 22. In the embodiment shown, the air gun outlet 18 includes a threaded female socket portion 24 adapted to receive the compatibly threaded male portion 26 provided at the inlet end 28 of the nozzle 22.

The quick-change coupling adaptor 20 provides a means whereby the nozzle 22, and an assortment of similar nozzles, can be quickly connected and disconnected without the need for threading and unthreading the nozzles into place as would otherwise be required. To this end the nozzle 22 differs from a conventional nozzle by including a ball-receiving groove 30 disposed between its inlet end 28 and its outlet end 32. The nozzle 22 is provided with connecting passages 21 and 23 and can also be provided with pressure relief openings 25. The quick-change coupling adaptor 20 will now be described with greater particularly with reference to FIGS. 2-6.

The coupling adaptor 20 includes a body 34 having a reduced diameter inlet end 36 compatibly threaded to be received by the blow gun socket portion 24 and having an annular flange 38 at the outlet end. The body 34 includes a socket 40 having a connecting passage 41, and a plurality of openings 42 circumferentially spaced at one hundred and twenty degrees (120°) in the embodiment shown, each opening receiving a ball 44, constituting a latch means, as best shown in FIG. 5. The body socket 40 is sized to receive a cup-shaped plunger 50 in sliding relation and includes an intermediate annular face 46. A compression spring 56 is received within the cylindrical plunger sidewall 52 and extends between the plunger annular end wall 54 defined by aperture 55 and the body annular face 46 to provide means for biasing the plunger 50 outwardly. Guide means are provided between the plunger 52 and the body socket 40 in the form of cooperating tongue and groove elements. In the embodiment shown, the body socket 40 includes a plurality of circumferentially spaced longitudinally extending grooves 48 and the plunger sidewall 52 includes a plurality of associated tongues 58 set back from the plunger 54 and received by said grooves 48, said grooves being circumferentially spaced to coincide with the spacing of the latch balls 44 said tongue and groove elements cooperating to provide a guide means for the plunger 50. In the embodiment shown the ball receiving openings 42 intercept the grooves 48 and the grooves are slightly narrower in width than the diameter of the balls 44 to provide a stop limiting radially inwardly movement of said balls. Engagement between the end of the plunger tongues and associated balls 44 provides a means of limiting outward movement of said plunger which, in turn, overlaps the balls to provide a lock member precluding inward movement of said balls.

A sleeve 60 is disposed about the body 34 in sliding relation and includes a forward socket portion 62 configurated to receive the balls 44 when the sleeve is in a rearward position shown in FIG. 3 and a rearward socket 64 sized to receive a compression spring 66 which extends between an annular face 68 defined by the socket 64 and a retaining ring 70, accommodated within a circumferential groove 72 provided in the body 34, said spring providing a means for biasing the sleeve 60 outwardly. The body flange 38 is engageable by the sleeve end rim 69 and provides a means of limiting outward movement of said sleeve. In the embodiment shown, the sleeve 60 outer surface is stepped to provide a suitable gripping surface.

While the coupling adaptor 20 is shown as receiving a nozzle 22 having a threaded end 26 of the type which would conventionally be threadedly connected directly to the blow gun 12 said adaptor can also be used with a modified nozzle 22a, shown in FIG. 7, which includes an unthreaded end 26a and is otherwise substantially identical to nozzle 22.

It is thought that the structural arrangement of parts and functional advantages of this quick change blow gun nozzle system have become fully apparent from the foregoing description of parts but for completeness of disclosure the assembly and operation of the system will be briefly described.

The coupling adaptor 20 is connected simply by threading it into position within the blow gun outlet socket 24. With the sleeve 60 in the forward position before insertion of the nozzle 22, the front wall 54 of the plunger 50 is engaged with the balls 44, as shown in outline in FIG. 2, said balls being seated upon the sleeve intermediate portion 61 and projecting inwardly of associated longitudinal socket grooves 48. When the sleeve 60 is pulled rearwardly the balls 44 are cammed radially outwardly by the plunger 50 with the result that the plunger 50 and sleeve 60 are held in a latched condition by said balls, said plunger and sleeve overlapping said balls to hold said balls in the position shown in FIG. 3. When the nozzle 22 is inserted within the body socket 40 to engage the plunger 50 and push said plunger rearwardly the balls engage the threaded side of said nozzle 22 and retain the sleeve 60 in place until said nozzle is inserted sufficiently within the socket 40 that the circumferentially extending nozzle groove 30 is disposed in ball-receiving relation adjacent said balls, at which time the sleeve 60 cams the balls into position within said groove 30 and snaps forward into engagement with the flange 38 so that the sleeve intermediate portion 61 engages the balls 44 to lock said balls, and therefore said nozzle, into place. When it is desired to release the nozzle 22 it is simply a matter of pulling sleeve 60 rearwardly so that the balls can be cammed outwardly into the forward sleeve socket 62 as the nozzle 22 is urged outwardly by the plunger 50. The outward movement of the plunger 50 is limited by engagement by the plunger tongues 58 with the balls 44 and the sleeve 60 is held in the rearward position pending insertion of another nozzle 22.

Although the invention has been described by making detailed reference to a single preferred embodiment, such detail is to be understood as an instructive, rather than any restrictive sense, many variants being possible within the scope of the claims hereunto appended.

We claim as our invention:

1. An air gun assembly having a quick-change nozzle system, comprising:
   (a) an air gun including an inlet connectible to an air supply and an outlet selectively delivering a stream of pressurized air,
   (b) a nozzle having an inlet and an outlet for directing the air stream, and
   (c) a quick-change coupling adaptor including means at one end connectible to the outlet of the air gun and means at the other end adapted to receive the nozzle in quick-change relation,
   (d) the nozzle including latch-engaging means,
   (e) the adaptor including:
   1. a body having a socket defining an open end receiving the nozzle in sliding relation,
   2. latch means carried by the body in spaced relation from said open end,
   3. a plunger slidably mounted in the socket and including means biasing said plunger outwardly toward said open end, said plunger being engageable by said latch means to limit outward movement of said plunger and being engageable by said nozzle to move said plunger inwardly out of engagement with said latch means when said nozzle is inserted within said body socket, and
   4. a sleeve slidably mounted on the body and including means biasing said sleeve toward said socket open end, said sleeve being engageable with said latch means to urge said latch means into engagement with said nozzle latch-engaging means when said sleeve is in one position and said sleeve retaining said latch means when said latch means moves out of engagement with said nozzle latch-engaging means when said sleeve is in another position.

2. An air gun as defined in claim 1, in which:
   (f) the latch means includes at least one opening having a ball disposed therewithin, and
   (g) the nozzle latch-engaging means includes a circumferential groove receiving said ball.

3. An air gun as defined in claim 1, in which:
   (f) at least one axially extending guide means is provided between said adaptor body socket and said plunger for guiding said plunger within the socket.

4. An air gun as defined in claim 3, in which:
   (g) said guide means includes cooperating tongue and groove elements, one of said elements being formed on the socket wall and the other of said elements being formed on the plunger wall.

5. An air gun as defined in claim 1 in which: (f) the latch means includes a plurality of circumferentially spaced openings each having a ball disposed therewithin,
   (g) the nozzle latch engaging means includes a circumferential groove receiving said balls,
   (h) a plurality of guide means is provided between said adaptor body socket and said plunger disposed in circumferentially spaced axially extending relation each of said guide means including cooperating tongue and groove elements, one of said elements being formed on the socket wall and the other of said elements being formed on the plunger wall, and
   (i) said latch balls are coincidentially spaced with said guide means whereby each ball is disposed in aligned relation with a guide means.

6. An air gun as defined in claim 5, in which:
   (j) said guide grooves are formed in said socket and said guide tongues are formed on said plunger.

7. An air gun as defined in claim 6, in which:
   (k) said plunger includes a forwardly disposed endwall, and said tongues are disposed rearwardly of said endwall so that said plunger is disposable in overlapping locking relation with said balls when said plunger is in the forward position.

8. An air gun as defined in claim 1 in which:
   (f) the body includes a circumferentially extending abutment flange, and
   (g) said sleeve includes an annular rim engageable with said flange to limit movement of said sleeve on said body.

9. An air gun as defined in claim 6, in which:
   (k) said sleeve includes an internally formed annular socket engageable by said balls and sized to permit said balls to move radially outwardly relative to said body to permit said nozzle to be removed from said socket.

10. An air gun as defined in claim 1, in which:
    (f) said sleeve includes a plurality of circumferentially formed, longitudinally spaced steps providing a gripping surface.

* * * * *

UNITED STATES PATENT AND TRADEMARK OFFICE
CERTIFICATE OF CORRECTION

PATENT NO.   : 4,919,334

DATED        : April 24, 1990

INVENTOR(S)  : Hartmann et al.

It is certified that error appears in the above-identified patent and that said Letters Patent is hereby corrected as shown below:

Column 4, line 45, before "outline in FIG. 2," add --phantom--

Column 6, line 9, delete --(f) the--

Column 6, line 10, before "latch means..." add --(f) the--

Signed and Sealed this

Eleventh Day of February, 1992

Attest:

HARRY F. MANBECK, JR.

*Attesting Officer*          *Commissioner of Patents and Trademarks*